United States Patent [19]

Gale

[11] Patent Number: 5,299,413
[45] Date of Patent: Apr. 5, 1994

[54] CROP SENSING APPARATUS

[75] Inventor: Gerald E. Gale, Wilstead, England

[73] Assignee: British Technology Group Limited, London, England

[21] Appl. No.: 859,731

[22] Filed: Jun. 12, 1992

[30] Foreign Application Priority Data

Oct. 12, 1990 [GB] United Kingdom ............... 9022192
May 15, 1991 [GB] United Kingdom ............... 9110649

[51] Int. Cl.$^5$ ................................................ A01D 23/00
[52] U.S. Cl. .................................. 56/10.2; 56/121.46; 56/DIG. 15
[58] Field of Search ........... 56/10.2, DIG. 15, 121.46, 56/364

[56] References Cited

U.S. PATENT DOCUMENTS

| | | | |
|---|---|---|---|
| 3,906,710 | 9/1975 | Pask | 56/10.2 |
| 4,507,910 | 4/1985 | Thornley et al. | 56/10.2 |
| 4,539,798 | 9/1985 | Klinner | 56/14.6 |
| 4,720,962 | 1/1988 | Klinner | 56/10.2 |
| 4,843,806 | 7/1989 | Klinner | 56/364 |
| 4,896,486 | 1/1990 | Lundahl et al. | 56/10.2 |
| 4,967,362 | 10/1990 | Schutter et al. | 56/10.2 X |
| 5,044,147 | 9/1991 | Klinner | 56/14.6 |
| 5,199,248 | 4/1993 | Hale et al. | 56/10.2 |

FOREIGN PATENT DOCUMENTS

| | | |
|---|---|---|
| 778092 | 2/1968 | Canada . |
| 0241276 | 10/1987 | European Pat. Off. . |
| 2418995 | 11/1975 | Fed. Rep. of Germany . |
| 86/01972 | 4/1986 | PCT Int'l Appl. . |
| 91/03928 | 4/1991 | PCT Int'l Appl. . |
| 2044064 | 10/1980 | United Kingdom . |
| 2219482 | 12/1989 | United Kingdom . |

OTHER PUBLICATIONS

World Patents Index Latest, Sec. PQ, Week 8834, Derwent Publications Ltd., Class P12, AN 88-241059 and SU,A,1371-577, Feb. 1988, English Abstract.
WO.A. 8 601 972 (National Research Development Corporation) Apr. 10, 1986.
WO.a.9 103 928 (National Research Development Corporation) Apr. 4, 1991.

Primary Examiner—Terry L. Melius
Attorney, Agent, or Firm—Cushman, Darby & Cushman

[57] ABSTRACT

In a crop stripping apparatus for harvesting grain from standing crop, the height of an overhead hood (18) is adjusted in response to the position of the top of the crop. A sensor housing or nose (34) protrudes forwardly from the hood (18) and has a sloping undersurface (35) which contacts the crop. A pair of cooperating sensors (37) and (38) sense the position of the top of the crop by contact of one or both or neither of the sensors with the top of the crop. The crop slides along the undersurface (35) of the nose (34) with minimum disturbance to the grain heads by the effect of the sensing operation. The nose (34) is mounted in such a manner that the undersurface (35) is maintained at a constant inclination to the ground during vertical movement of the nose (34).

31 Claims, 11 Drawing Sheets

CROP SENSING APPARATUS

The present invention relates to apparatus for sensing the position of the top of a crop, and to apparatus for operating on a crop including agricultural and horticultural apparatus.

The invention has application in any agricultural operation where the height of the crop being operated on varies, and it is necessary to know the position of the top of the crop. The invention finds use for example in crop sprayers, weed wipers, fertiliser distributors, conventional combine harvesters where the crop is cut and threshed in the combine, and crop stripping harvesters where the grain is stripped from standing crop, leaving the stripped straw standing in the field. Where the invention is used with a crop spraying apparatus, the invention may be used in controlling the height of the spray boom, and if required the two booms of a typical spraying apparatus can be controlled independently. Where the invention is used with a combine harvester, the invention may be used in controlling the height of the cutting table.

Another application may be in fertiliser distribution. Many granulated fertiliser distributors consist of a spinning disc fitted under a hopper, all mounted on the hydraulic arms on the back of a tractor. Material falling from the hopper onto the spinning disc is thrown off and spread above the crop, with the intention of covering a known area. One parameter to be considered in achieving such action is the height of the disc above the crop. This may be adjusted by the driver lifting or lowering the hydraulic linkage manually, or the operation can be automated.

In a broad sense, a main use of the invention is to monitor a crop profile or contour and to control a machine in response to the sensor output so as to relate the position of the operating parts to that profile.

The invention also has application in monitoring the height of the crop after an operation has been carried out on it, for example the height of a hedge after it has been cut.

It occurs in many agricultural machines that the height of the crop being operated on needs to be known and operating parameters of the machine need to be adjusted either manually or automatically, in response to the height of the crop. Examples include combine harvesters where the height of the cutting table may need to be adjusted in response to the height of the crop, and crop spraying apparatus where the spray boom may need to be adjusted for the same reason. By way of example, there is shown in Canadian Patent CA-778092 (Kaminski) a conventional combine harvester with a height adjustable platform and cutter bar. Crop height sensing units are positioned ahead of the cutting table suspended from an overhead boom. Microswitches are operated by lever arms which strike the crop tops, the cooperating pairs of sensing units being positioned with the upper sensor positioned vertically immediately above the lower sensor.

A disadvantage of such arrangements is that the sensors strike directly against the grain heads, with consequent disturbance of the crop and loss of grain. It is an object of the present invention to provide crop sensing apparatus which operates with minimum disturbance of the tops of the crop. In particular, the invention finds application with a form of crop harvesting apparatus which is referred to as crop stripping, where a rotor or other moveable support means carries a plurality of outwardly projecting crop engaging elements which move upwardly and rearwardly through the crop and strip required crop parts from the crop while leaving stripped remaining stems standing in the field. An example of such a crop stripper is described in our previous published patent application WO 86/01972 (NRDC). In such apparatus there is a requirement to adjust the height of an inlet edge of an overhead hood which is positioned over the stripping elements, and the present invention is particularly applicable in providing crop sensing apparatus for use with such a crop stripper. It is a feature of such crop stripping machines that they can operate with a much higher forward speed than conventional combine harvesters. The use of known crop height sensing apparatus with such crop strippers would be particularly disadvantageous since the higher forward speed increases losses due to disturbance of the tops of the crop.

In accordance with the present invention there is provided apparatus for sensing the position of the top of a crop comprising a support structure adapted to be attached to a mobile machine, and at least two sensors mounted on the support structure in such a manner as to be spaced apart vertically in use and to sense the position of the top of a crop by contact of different combinations of sensors with the crop during forward movement of the machine relative to the crop, in which the support structure has an undersurface adapted to be presented to the top of the crop with the undersurface facing downwardly and sloping upwardly in the forward direction of intended movement of the support structure with the machine, the sensors being spaced apart along the said undersurface in the said direction of intended movement.

There is also provided in accordance with the invention apparatus for operating on a crop comprising a mobile frame for movement relative to a standing crop, and operating means mounted on the frame for operating on the crop, together with crop sensing apparatus as set out in the previous paragraph.

Preferably, a pair of cooperating sensors is provided and the two sensors are arranged to sense the position of the top of a crop by contact of one or both or neither of the sensors with the top of the crop.

Preferably the apparatus includes means for varying the height of the support structure automatically in response to changes in crop height, and in such a manner as to maintain substantially constant the slope of the undersurface of the support structure during variation in height of the support structure. By maintaining the slope of the undersurface substantially constant, the difference in height between sensors mounted on the support structure can be maintained constant, so that the relationship between signals derived from the sensors is not distorted by variations in the height difference between the sensors.

Preferably there is included control means for varying an operating parameter of the apparatus automatically in response to a measure of the position of the top of the crop. Conveniently, where the two cooperating sensors are provided, the two sensors comprise a lower sensor and a higher sensor, each sensor being switchable between a first state corresponding to contact with the crop and a second state corresponding to non-contact with the crop, the control means coupled to the two sensors and being arranged to respond to three combinations of states of the pair of sensors, namely to respond to crop contact with neither sensor, by decreasing the height of a component of the machine; to respond to crop contact with both sensors, by increasing the height of the component of the machine; and to respond to crop contact with the lower sensor only, by making no change in the height of the said component of the machine.

In most applications of the invention, the control means for varying the operating parameter comprises means for varying the height of a component of the apparatus automatically in response to changes in height at the top of the crop. It is particularly preferred that the support structure is coupled to the said component in such a manner that the height of the support structure is varied by movement of the component but the slope of the undersurface of the support structure is maintained substantially constant. In one preferred form, the support structure is mounted by a parallelogram linkage having one pivot point fixed relative to the support structure, one pivot point fixed relative to the moving component, and two further pivot points fixed relative to a selected frame of the apparatus. The selected framework may comprise the mobile main frame of the apparatus, or may be a sub-frame which itself is moveable relative to the main frame.

The invention has particular use where the apparatus includes a moveable hood extending over at least part of the operating means, the support structure being coupled to the hood, and the hood being moveable to vary the height of the front of the hood in response to changes in crop height. In a preferred form, the hood defines a crop flow passage between the underside of the hood and the operating means and the front of the underside of the hood is bounded by a hood inlet edge positioned at the inlet to the crop flow passage, the support structure being coupled to the moveable hood in such a manner that the hood inlet edge is positioned at a height which is a substantially constant proportion of the average height of the crop. Preferably the proportion lies in the range 70% to 90%, preferably about 80%, where most ordinary cereal and herbage crops are concerned. With such crops the seed parts tend to be grouped at the top of the stem. There are, however, other problem crops such as Navy beans which are very short, and field beans, on which the seed parts are freely distributed over the length of the stems, where a precise setting of the proportional height is difficult to define. In such cases the height of the hood inlet edge as a proportion of the crop height may be set up by trial and error on the day to get the best result.

The required positioning of the hood inlet edge may be achieved by an arrangement in which the support structure is coupled to the moveable hood in such a manner that the vertical height difference between the sensors and the hood inlet edge, increases as the hood is raised, and decreases as the hood is lowered.

The invention is particularly applicable where the operating means comprises crop stripping means for stripping from a standing crop required parts of the crop to leave the remaining stripped parts of the crop standing in the field.

By the term standing crop is meant crop in the field before any harvesting operation has been carried out on it, for example before any cutting operation, and the term standing crop includes crop which may be laid, leaning, or twisted, as well as upright crop.

In a preferred form, the crop stripping means may comprise a plurality of outwardly projecting crop stripping elements mounted on a moveable support means, and drive means for driving the moveable support means so as to move the crop stripping elements along a path which includes movement upwardly and rearwardly as the apparatus moves forwardly into the crop. A hood may be provided extending over at least part of the crop stripping means, and the control means may be arranged to vary the position of the hood in response to changes in crop height.

It will be appreciated that the sloping undersurface provided in accordance with the present invention, together with the feature that the sensors are spaced apart horizontally as well as vertically along the undersurface of the support structure allows the crop sensing operation to be carried out with less disturbance of crop than has previously been possible. The tops of the crop, for example heads of a grain crop, slide gently under the sloping surface and the sensors can be arranged to be operated by only a light touch of the crop on the sensors. Preferably the undersurface of the support structure is inclined to the horizonal (when in use), at an inclination chosen so that a predetermined acceptable variation in crop height does not trigger a response. In a practical example, the angle of inclination of the undersurface of the support structure may lie in the range 5° to 45°.

The invention is particularly applicable where the agricultural machine includes means for operating on the crop, and a hood extending over at least part of the operating means, the support structure being mounted on the front of the hood, and the control means being arranged to vary the height of the front of the hood in response to change in crop height. Preferably, there is included means for moving the support structure relative to the hood in order to compensate for changes in angle in the slope of the said undersurface produced by movements of the hood.

In a preferred form of each sensor, in accordance with the invention, each sensor comprises a moveable sensing element pivoted about a horizonal axis and a counterbalance element pivoted about the same axis and arranged to counterbalance the moveable sensing element.

Reference has been made above to the monitoring of the sensor support structure so as to maintain the slope of the underside constant. Such an arrangement can be used independently of the inventive feature of the sloping underside of the support structure, for example with other kinds of sensor.

According to the invention in a further independent aspect there is provided agricultural apparatus comprising a mobile frame for movement into standing crop, operating means mounted on the frame for operating on the crop, a support structure positioned at the front of the apparatus, and sensor means mounted on the support structure in such a manner as to sense the top of a crop by contact of the sensor means with the crop during forward movement of the apparatus into the crop, and control means for varying the height of a component of the apparatus automatically in response to changes in height of the top of the crop sensed by the sensor means, the support structure being coupled to the component in such a manner that the height of the support structure is varied by movement of the component but the angle of presentation of the support structure to the crop is maintained substantially constant.

Embodiments of the invention will now be described, by way of example only, with reference to the accompanying drawings in which.

Figure 1:
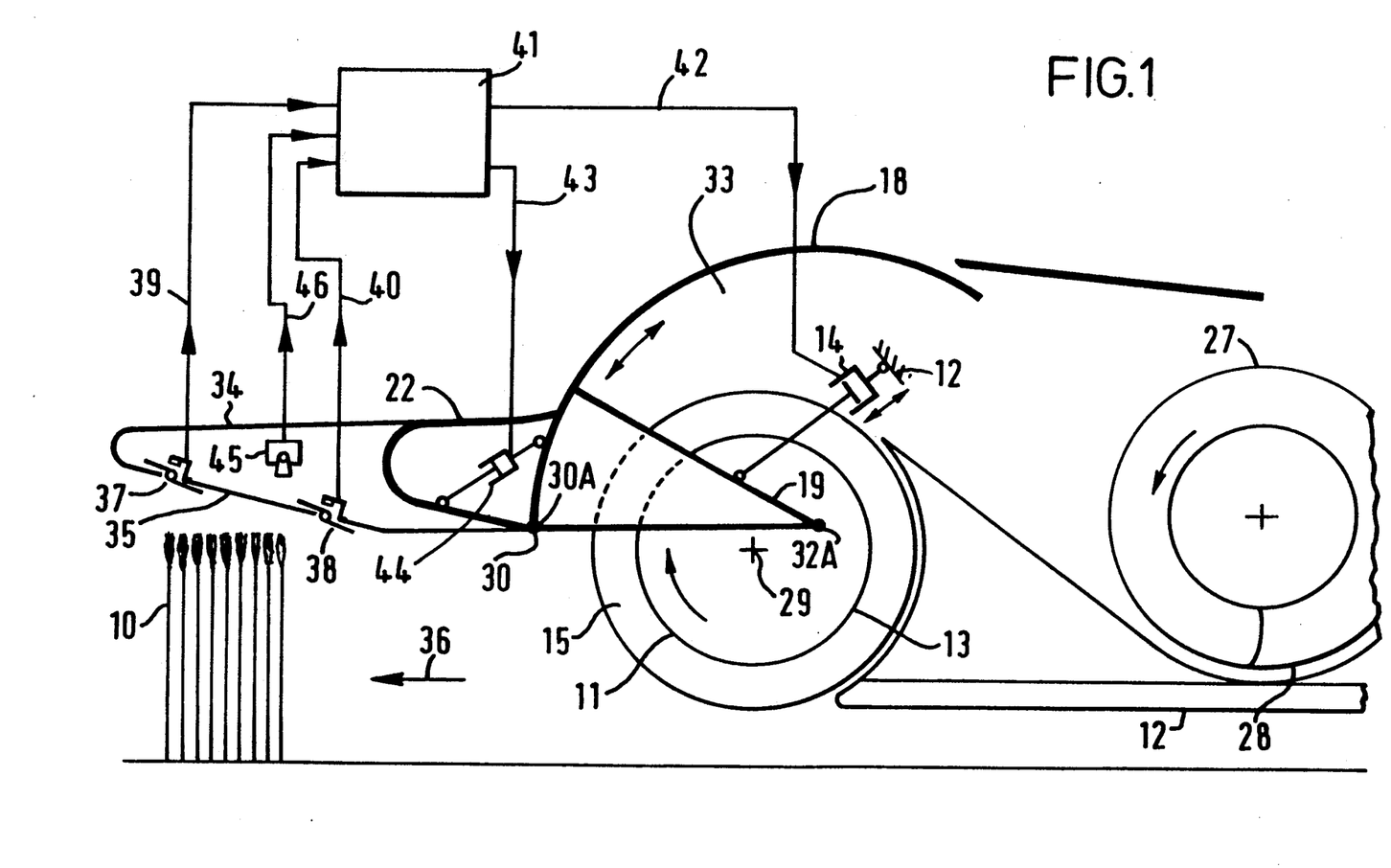
FIG. 1 is a diagrammatic cross-section of a grain stripping apparatus embodying the invention.
Figure 2:
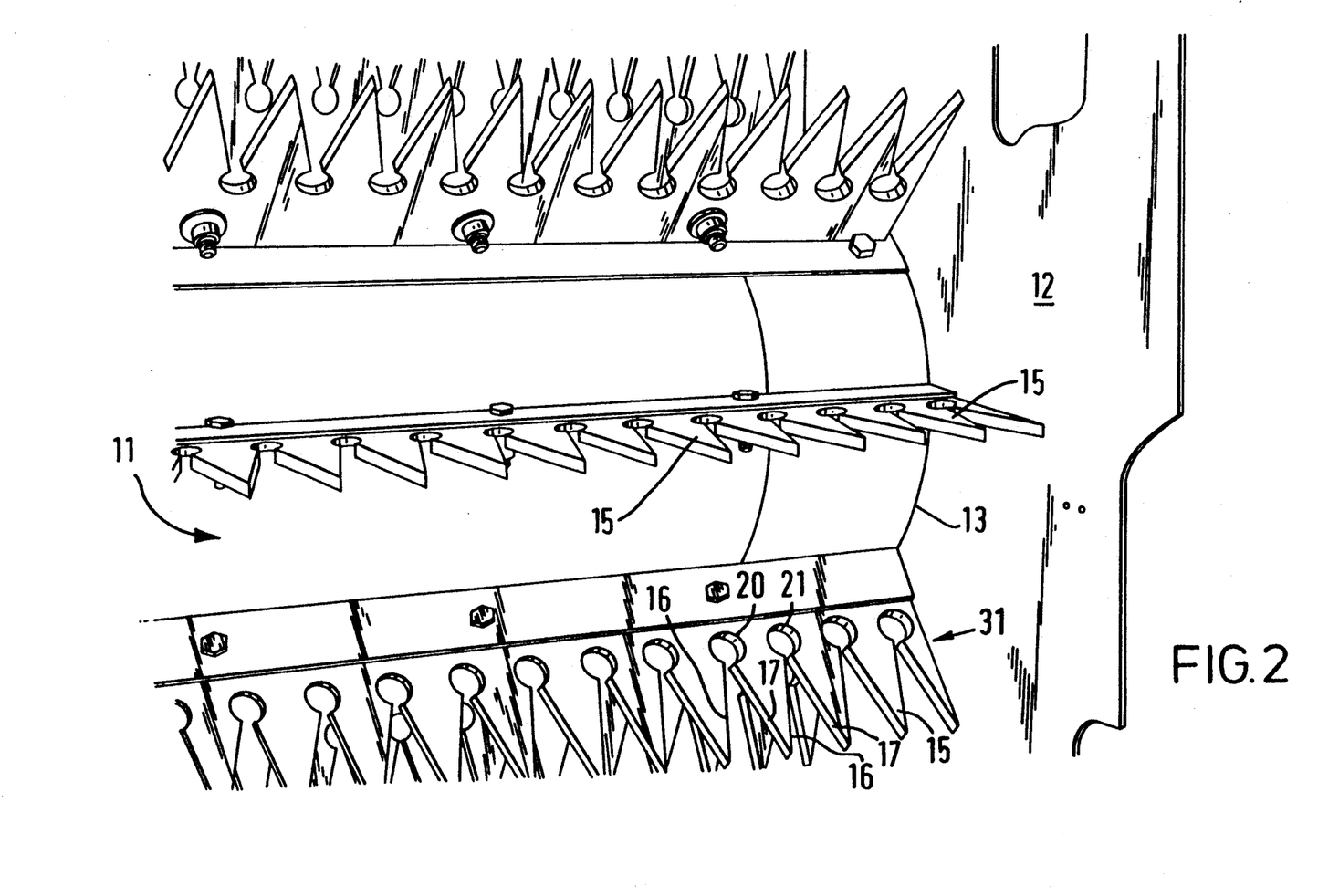
FIG. 2 is a front view of a crop stripping rotor suitable for use in the apparatus of FIG. 1.

Referring to FIGS. 1 and 2, the apparatus shown by way of example is a harvesting apparatus for stripping grain from a cereal crop 10. The apparatus comprises a mobile frame 12 (for example the frame of a header of a grain harvester) on which is mounted a rotor 11, carrying outwardly projecting crop engaging elements 15. The rotor 11 is driven in the so-called overshot mode so that the crop engaging elements 15 are moved in an upward direction at the front of the apparatus. The rotor 11 rotates about a horizontal axis 29. A hood or cover 18 extends around part of the front half of the rotor and defines with the rotor elements 15 a crop flow passage 33 along which crop is conveyed by the rotor. The hood has a protruding front portion 22 referred to as the hood nose.

In operation, rotation of the rotor 11 moves the crop engaging elements 15 so that the distal tips of the elements enter the crop 10 with minimum disturbance of the stems of the crop, and the elements 15 then move upwardly through the crop, gathering one or more crop stems. As the elements 15 reach the upper parts of the crop, the required crop parts, for example grain, are detached from the stems. After detachment, the required crop parts are conveyed upwardly and rearwardly over the rotor 11 and pass to a transverse crop feed auger 27 positioned within a collecting trough 28, for transferring crop laterally towards the centre of the apparatus.

As shown in FIG. 2, the rotor 11 comprises an inner core 13 and a succession of transverse combs 31 spaced circumferentially around the rotor. Each tooth 15 of the comb has side edges 16 and 17 which, for each element, diverge from each other in a direction away from the distal tip of the tooth 15. There is provided at the junction of each adjacent pair of side edges 16 and 17 of adjacent teeth 15, an enlarged aperture 21 formed by relieved portions of adjacent teeth at the base regions thereof. In operation material including grain, grain heads, and some straw, is dislodged by the edges 20 of the apertures 21 of the teeth 15, and is impelled upwardly and rearwardly along the passage 33 to the auger 27.

The general operation of the crop stripping rotor 11 may be as set out in our prior published patent application WO 86/01972.

Referring to FIG. 1, the hood 18 has a cross section which follows a part of a circle, having its centre at an axis indicated at 32A. The hood 18 is supported by side members 19 which allow pivoting of the hood 18 about the axis 32A, under the control of an electric actuator or hydraulic ram 14 coupled between one of the side members indicated diagrammatically at 19, and part of the frame 12. It will be apparent that contraction and expansion of the ram 14, causes the protruding front portion or nose 22 of the hood 18 to rise and fall, the main part of the hood 18 moving along a path which coincides with its own periphery.

It has been found that in grain stripping apparatus, front end grain losses depend upon a number of factors, but a main factor is the height of the hood inlet edge 30. One criterion is that height of the inlet edge 30 should be maintained at a predetermined relationship to the average height of the top of the crop, sometimes referred to as the crop horizon. In this embodiment, the present invention is concerned with apparatus for sensing the position of the top of the crop, and then adjusting the height of the hood inlet edge 30 automatically so as to follow variations in height of the crop.

Figure 3:
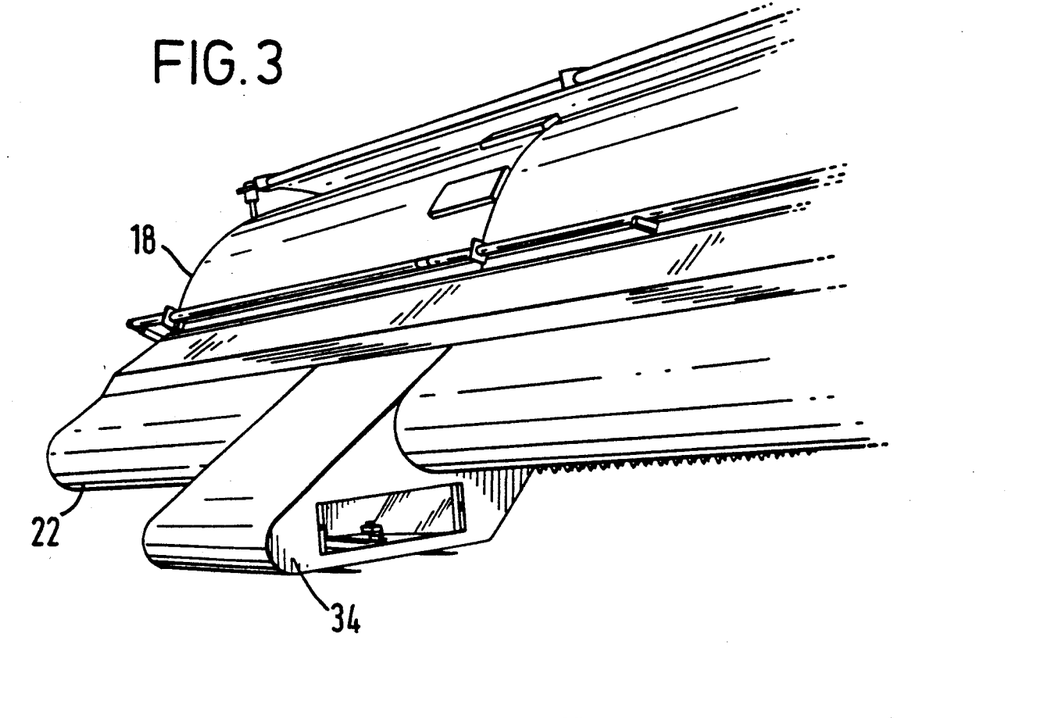
FIG. 3 is a perspective view of the front of the hood of the apparatus of FIGS. 1 and 2, including sensing apparatus embodying the invention.
Figure 4:
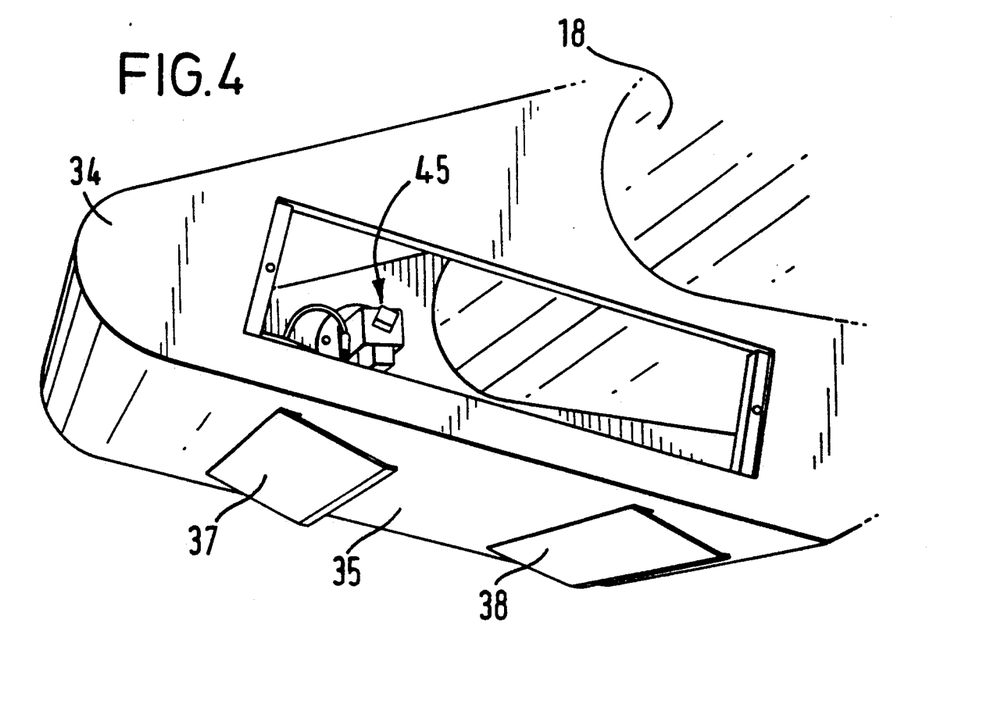
FIG. 4 is a perspective view of the underside of the sensing apparatus embodying the invention, positioned on the front of the hood of FIG. 3.

As shown in FIG. 1 and FIGS. 3 and 4, the main hood nose 22 protrudes forwardly from the hood 18 and extends across the whole width of the apparatus. Ar the centre of the apparatus, or alternatively at one side, a housing 34 (constituting a support structure) consists of an additional protruding portion (referred to as the sensor nose) which extends forwardly beyond the main hood nose 22, but extends only a small way across the width of the apparatus. The sensor nose 34 has an undersurface 35 which slopes upwardly in the forward direction 36 of intended movement of the apparatus. Mounted in the undersurface 35 are two bi-stable sensors 37 and 38 which are spaced apart vertically and horizontally. The two sensors 37 and 38 shown are positioned in line with the direction of forward movement 36, but this is not necessarily the case. One sensor could be slightly offset from the other. The sensors are arranged, as will be described hereinafter, to be switchable between two states one of which corresponds to contact with the top of the crop 10 and the other of which corresponds to non-contact with the crop. The sensors 37 and 38 produce electrical outputs along lines shown diagrammatically at 39 and 40, which are fed to a control system 41 conveniently mounted in the cab of the apparatus. Outputs from the control system 41 are fed along lines 42 and 43, leading respectively to the ram 14 for varying the height of the inlet edge 30 as described, and to a further ram 44 which is coupled between the hood nose 22 and the hood 18. In this embodiment, the sensor nose 34 and hood nose 22 are fixed together, and are moveable together relative to the hood 18 by pivoting about a pivot 30A in the region of the hood inlet edge 30, in response to contraction and expansion of the ram 44. There is also mounted in the sensor nose 34 an attitude sensor 45 which consists of a pendulum device feeding an electrical output along a line 46 to the control system 41, which gives an indication as to the attitude of the sensor nose 34 relative to the horizontal. The attitude sensor 45 is a pendulum driven potentiometer which allows the angle of the sensor nose 34 to be measured remotely, and the output signal is used to control the attitude of the sensor nose 34 by operation of the ram 44 under control of the control system 41.

In an alternative arrangement (not shown), the ram 44 may be positioned within the sensor nose 34 (instead of within the hood nose 22 as shown in FIG. 1). In such an arrangement, the hood nose 22 may be fixed relative to the hood 18, and the ram 44 may be arranged to move the sensor nose 34 only, relative to the hood nose 22. The sensor nose 34 may again pivot about a pivot axis in the region of the hood inlet edge 30, but in such a case the pivot is between the sensor nose 34 and the hood 18.

Figure 5:
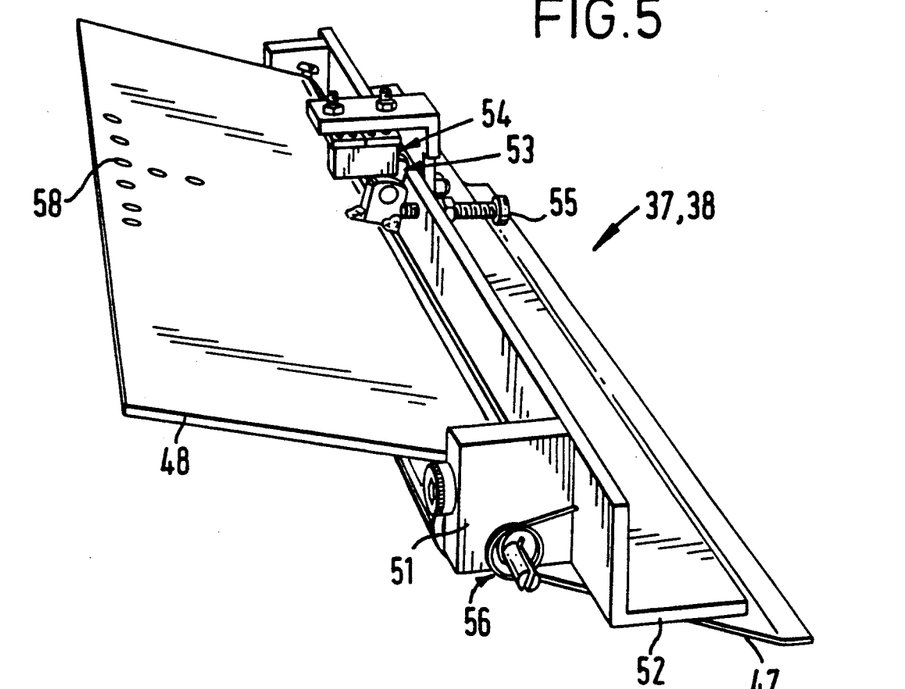
FIGS. 5 and 6 are perspective views, respectively from above and from below, of a sensor which may be used in the embodiment of the invention shown in the previous Figures.
Figure 6:
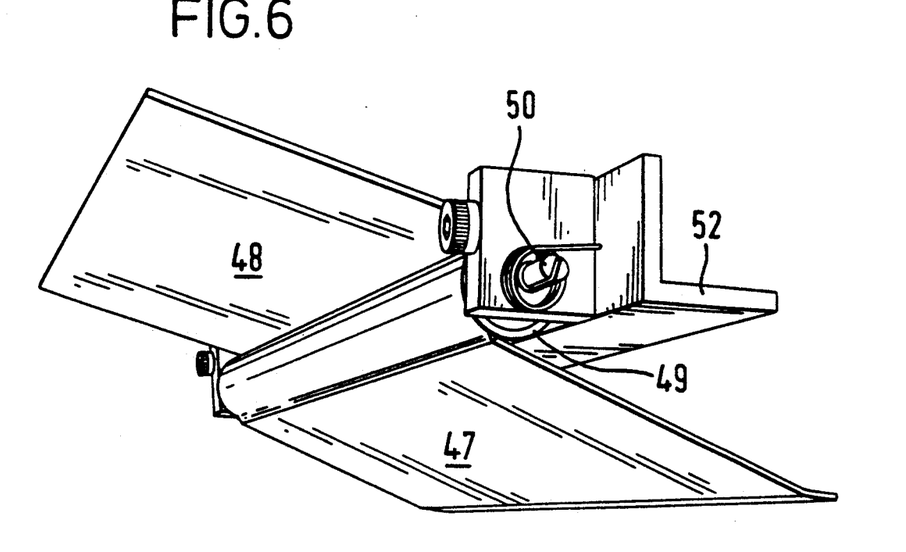

Referring particularly to FIGS. 1, 5 and 6, each of the sensors 37 and 38 consists of the following elements. Two aluminium plates 47 and 48 are welded symmetrically and tangentially on either side of a horizontal tube 49 whose ends are bushed and locate on a central round steel rod 50. The assembly pivots within nylon bearing blocks 51 mounted on a bracket 52 secured to the inside of the sensor nose 34. The aluminium plate 47 protrudes through a slot in the undersurface 35 and contacts the crop. A small soft iron lug 53 is fixed to the top side of the tube 49 and protrudes into the sensitive zone of a solid state Hall effect vane switch 54 which is also mounted on the aluminium bracket 52. When the tube assembly is pivoted through a few degrees, defined by an adjustable limit screw 55, the switch 54 changes from the off state to the on state, and vice versa. The assembly also incorporates a light coaxial spring 56 to bias the rotational movement to an off condition with a force of some 10 g, and a screw to fix this setting after adjustment. The reason for the two aluminium vanes 47 and 48, only one 47 of which contacts the crop, is that the other vane 48 counterbalances the crop contact vane 47. The balancing can be adjusted by drilling holes 58 as shown. The counterbalancing effect operates throughout the rotation of the vanes 47 and 48 due to the symmetrical shape thereof. Conveniently the solid state switches 54 control relays in the control system 41, which in turn control the rams 40 and 44, to raise and lower the hood 18 and to adjust the attitude of the support structure 34.

The operation of the apparatus is as follows. When the machine is at work in crop in the state shown in FIG. 1, the upper sensor 37 does not contact the crop, and the lower vane 47 is pivoted downwardly, as shown in FIG. 6. No signal is fed along the line 39. The sensor 38 does contact the crop, the lower vane 47 being pressed upwardly by the tops of the crop. A signal from the Hall effect switch passes along the line 40 to the control system 41. In this situation, the control system 41 effects no change by the rams 14 and 44.

Should a lower height of crop (for example laid crop or a gap in the crop) be encountered, then the lower sensor 38 will fail to make contact with the crop, and control system 41 will actuate the ram 14 to lower the hood inlet edge 30, until contact with the crop is re-established. If there is a gap and no crop present, an end of travel, limit switch (not shown) is operated when the hood inlet edge 30 reaches a predetermined minimum height. Conversely, if tall stems of crop occur, both sensors 37 and 38 make contact with the crop, and the control system 41 then actuates the ram 14 to raise the hood until the upper sensor 37 ceases to give an output signal.

The two sensors 37 and 38 are set in positions such that a crop height variation of a chosen amount, for example plus or minus 50 mm, does not call for any hood adjustment. However, since the sensor nose 34 is attached to the hood 18, which itself moves in an arc, any adjustment of the hood 18 causes a small change in the acceptable height range which is defined by the vertical distance between the sensors 37 and 38. To overcome this variation in acceptable height range, the angle of the sensor nose 34 is measured by the pendulum device 45 and an output signal is fed to the control system 41. Changes in the attitude of the sensor nose 34 are corrected by a signal sent along the line 43 to the ram 44 which adjusts the attitude of the sensor nose 34 relative to the hood 18. In a modification (nor shown), two or more cooperating pairs of sensors may be provided across the width of the apparatus, when it is important to note height variations across wide headers, or the hood may be sub-divided and each section individually controlled.

It will be appreciated that the provision of the undersurface 35 allows the crop tops to slide gently under the sensor nose 34 and allows a crop sensing operation to take place with minimum disturbance of the crop. The arrangement of sensors described allows sensing of the top of the crop by only a very light touch of the grain heads against the pivoted sensors. By way of example of dimensions which may be used, the sensor nose 34 may be about 390 mm wide, and may protrude about 350 mm forward of the main hood nose 22.

The spacing between corresponding points on the two sensors 37 and 38, centre to centre, may be conveniently in the range 100 mm to 200 mm, for example 150 mm. Conveniently the undersurface 35 is inclined to the horizontal when in use, at an angle in the range 5° to 45°, preferably in the range 10° to 30°. For a spacing between the sensors 37 and 38 of 150 mm, different angles of inclination to the horizontal of the undersurface 35 give acceptable bands of crop height as follows:

| Angle of Inclination | Band of Acceptable Crop Height |
| --- | --- |
| 5° | 13 mm |
| 10° | 26 mm |
| 25° | 70 mm |
| 30° | 75 mm |
| 45° | 106 mm |

Figure 7A:
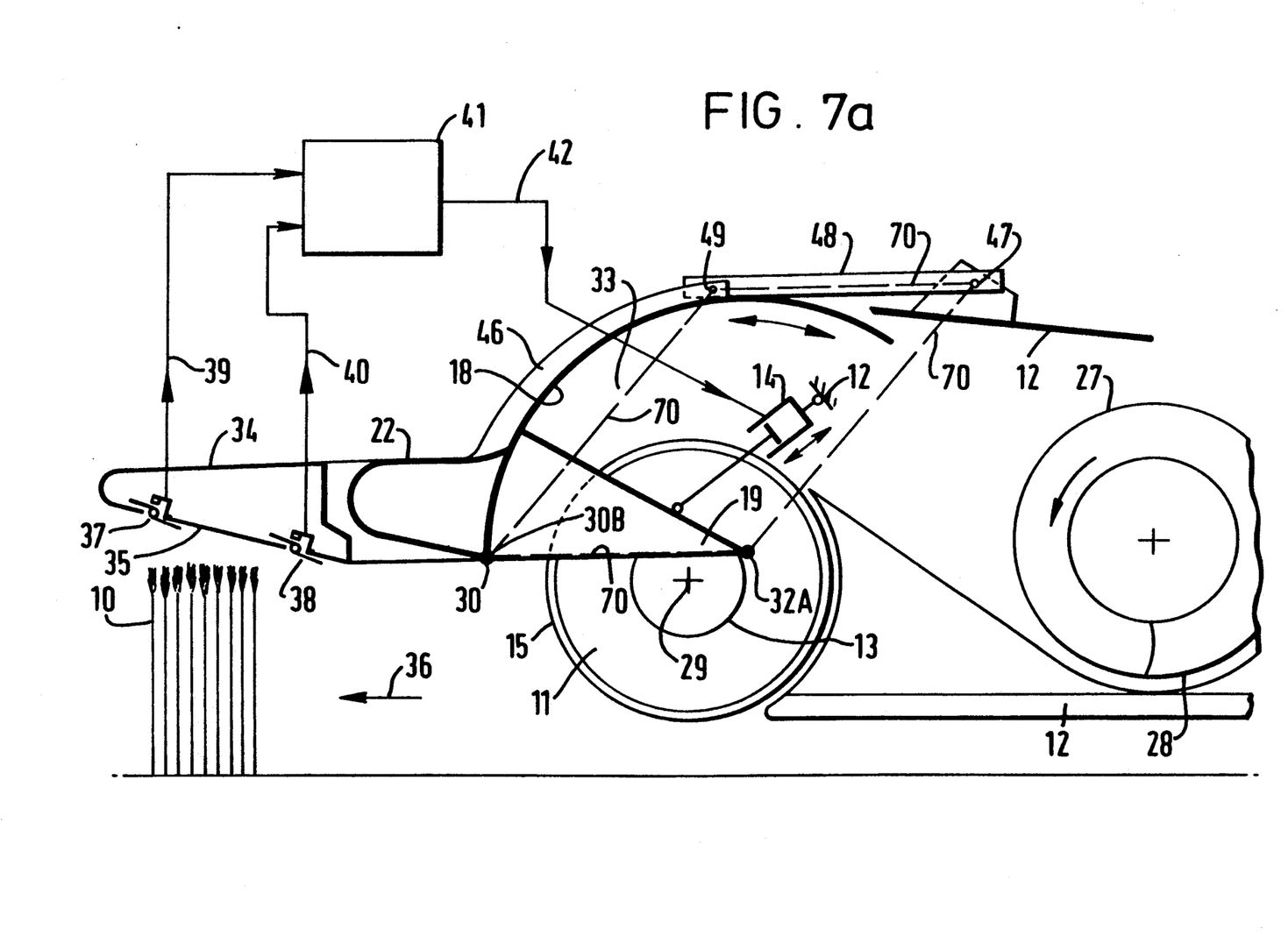
FIG. 7a is a diagrammatic side view, partly in section, of a modification of the grain stripping apparatus shown in FIG. 1.
Figure 7B:
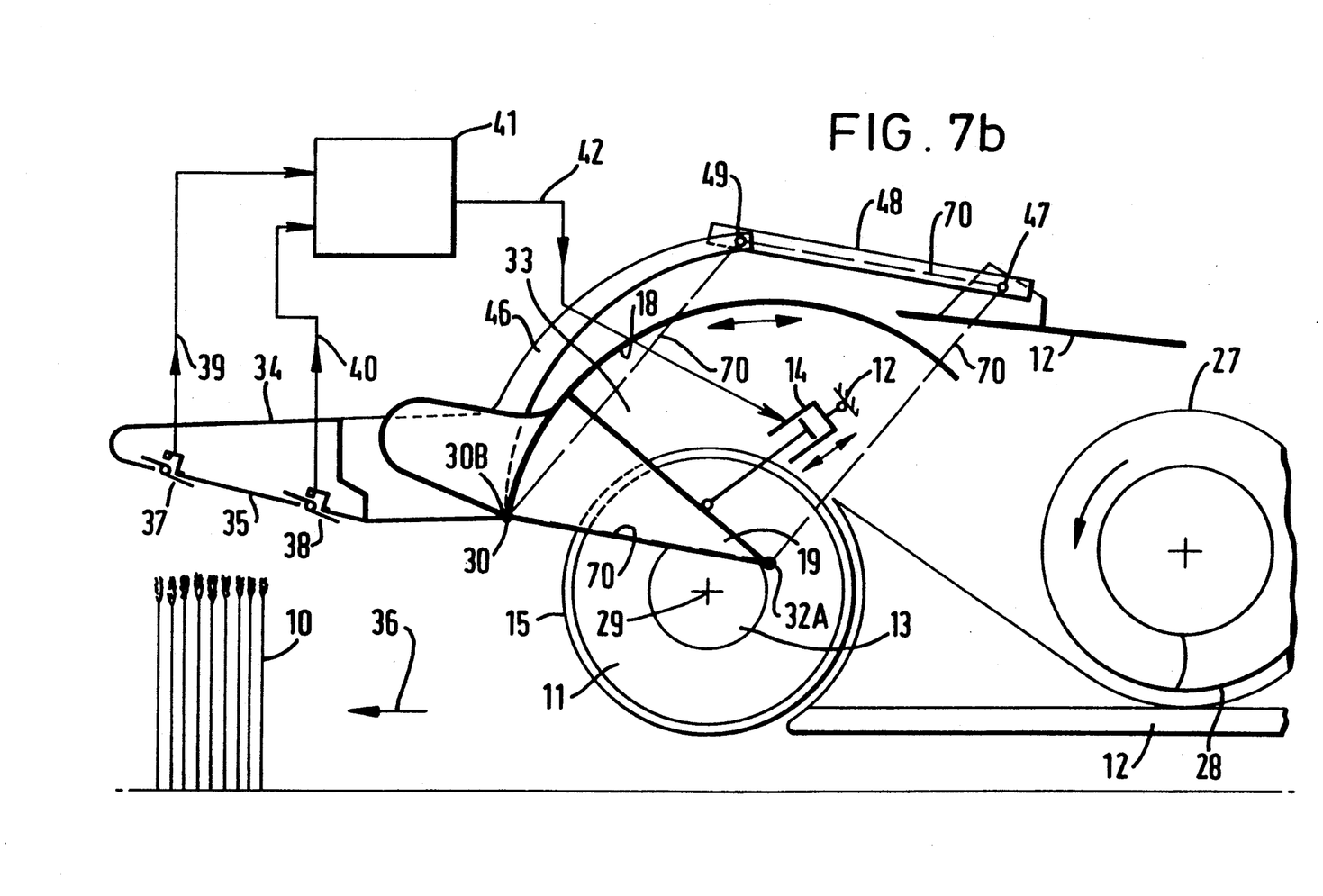
FIG. 7b shows the same side view with the moveable hood of the apparatus at a second higher position.

FIGS. 7a and 7b show a diagrammatic side view, partly in section, which corresponds to the view of FIG. 1, but shows a modification in which the sensor nose 34 is moveable relative to the hood nose 22 by pivoting about a pivot 30B, in the region of the hood inlet edge 30. The sensor nose 34 is mounted on a parallelogram linkage (to be described in more detail hereafter) such that movement of the hood 18 automatically produces the required movement of the sensor nose 34, which has previously been described as being effected under the control of the attitude sensor 45 in FIG. 1. In FIGS. 7a and 7b, the parallelogram linkage ensures that the sensor nose 34 moves upwardly and downwardly with the hood nose 22, but the sensor nose angle is adjusted to maintain the undersurface 35 at a constant angle relative to the horizontal. In the description of FIGS. 7a and 7b, and also subsequent figures, components corresponding to components in FIG. 1 are indicated by like reference numerals.

Referring to FIG. 7a, the sensor nose 34 is mounted on a side support arm 46 on the far right hand side of the apparatus and is cantilevered laterally from the side support arm 46 so as to be positioned in front of the hood nose 22. The hood nose 22 is fixed relative to the hood 18, and the sensor nose 34 is pivoted for movement relative to the hood 18, at the pivot 30B in the region of the hood inlet edge 30. At the upper end of the support arm 46, the arm is connected by a floating pivot 4g to an upper link 48, which itself is secured by a pivot 47 to part of the frame 12 on the right hand side of the apparatus.

FIG. 7b shows the same apparatus as FIG. 7a, but with the hood 18 at a higher position, produced by contraction of the ram 14 and pivoting of the hood 18 about the hood pivot axis 32A on the two hood side members 19. As will be seen from FIG. 7b, the inclination of the undersurface 35 remains constant during movement of the hood 18 relative to the frame 12. This is achieved because the sensor nose 34 is mounted by the parallelogram linkage comprising the sensor nose support arm 46, the upper link 48, and a lower link formed by the lower side of the right hand, support arm 19 (obscured in the drawing by the left hand arm 19 ), where it extends between the sensor nose pivot axis 30B and the hood pivot axis 32A. The essential geometry of the parallelogram linkage is indicated by broken lines 70.

It is to be appreciated that the components of the parallelogram linkage, particularly the components 19, 46 and 48, are shown diagrammatically, and in practice may be shaped differently, to avoid fouling of components on moving parts of the hood, or other operating parts of the apparatus.

Figure 8:
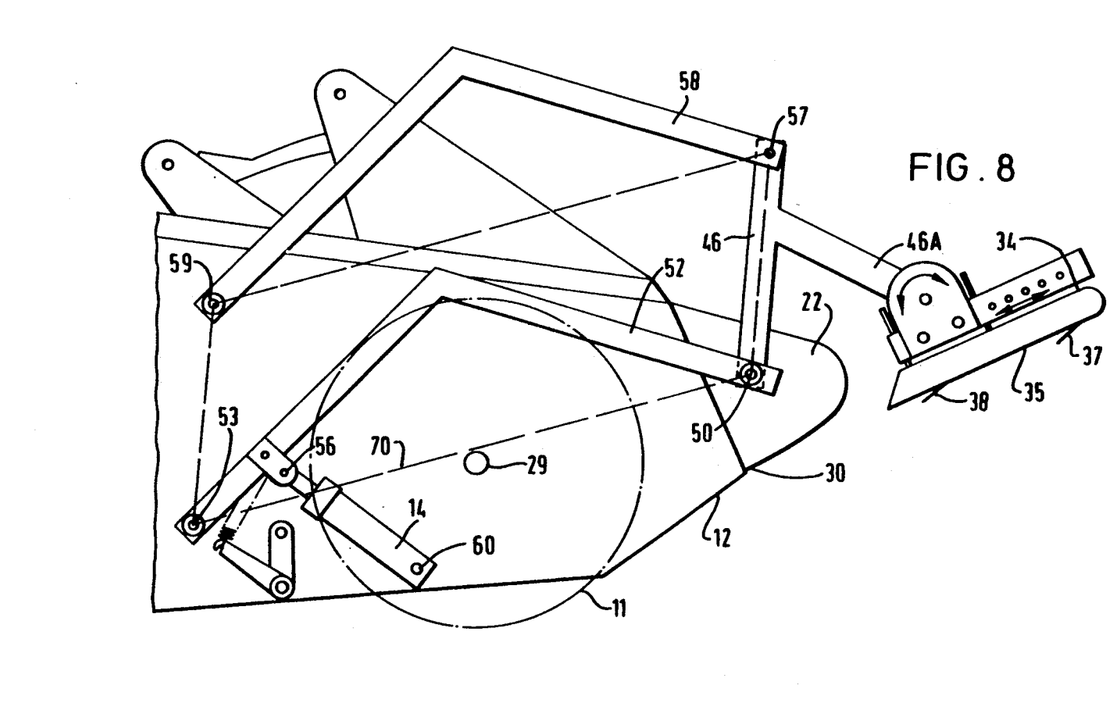
FIG. 8 is a side view of a modification of the apparatus of FIGS. 1, and 7a and 7b, in which the moveable hood is moveable along a different, and more complex path.
Figure 8A:
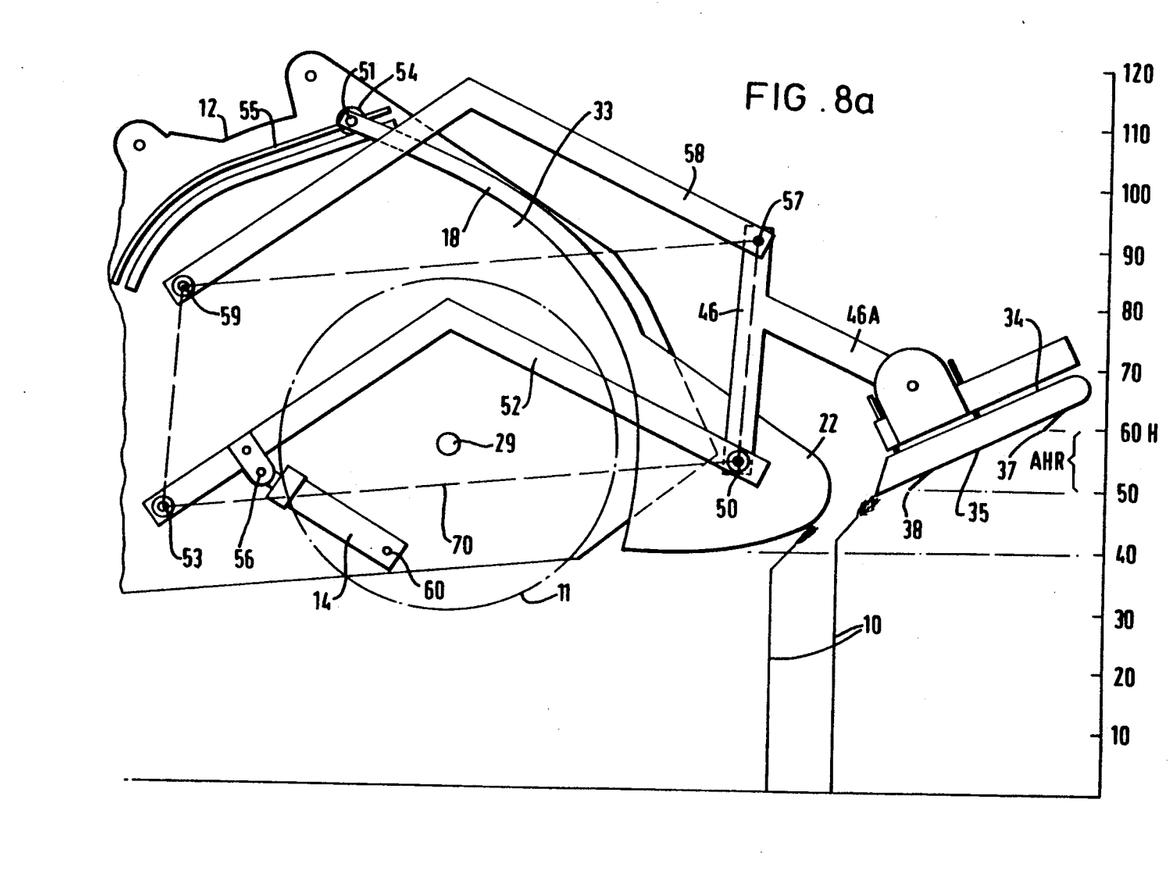
FIG. 8a is a diagrammatic side view, partly in section, of the apparatus of FIG. 8
Figure 8B:
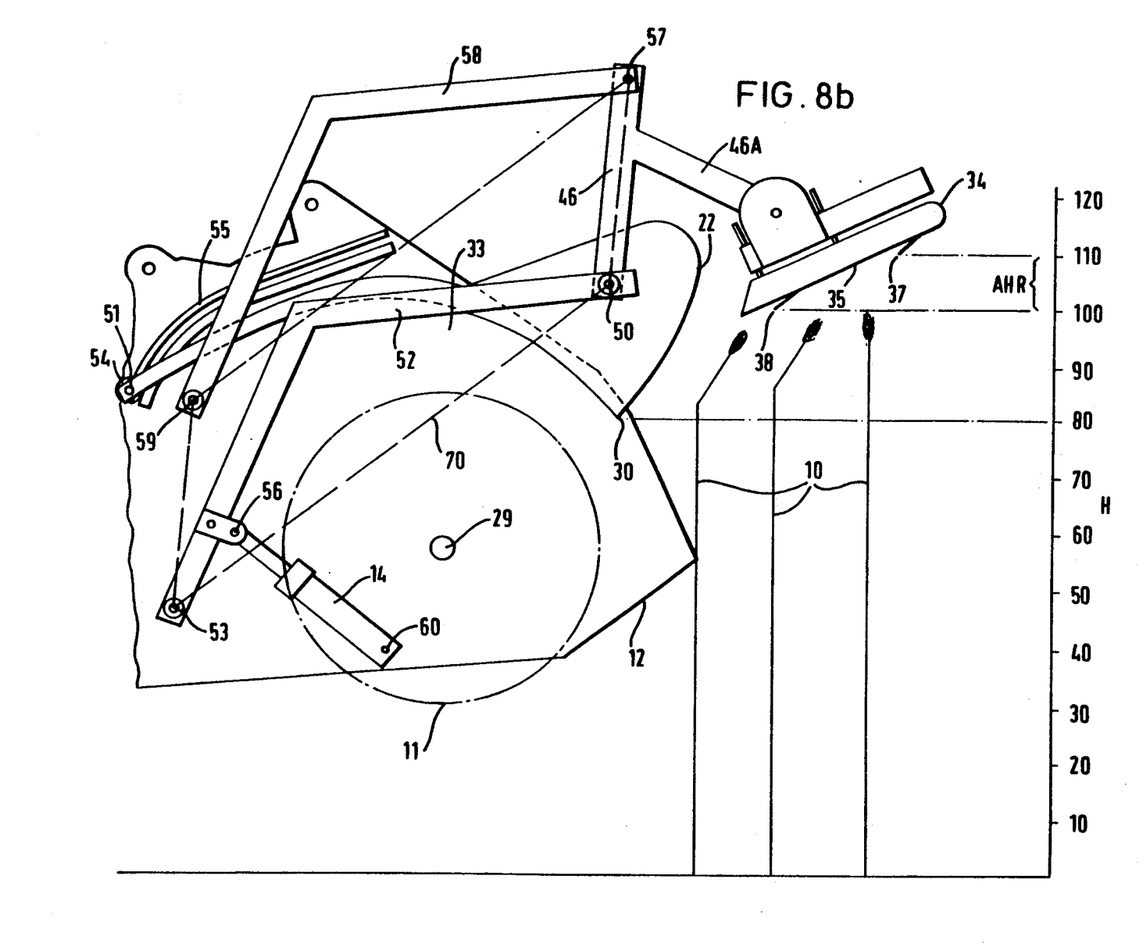
FIG. 8b shows the same apparatus but with the hood at a different, higher position.
Figure 8C:
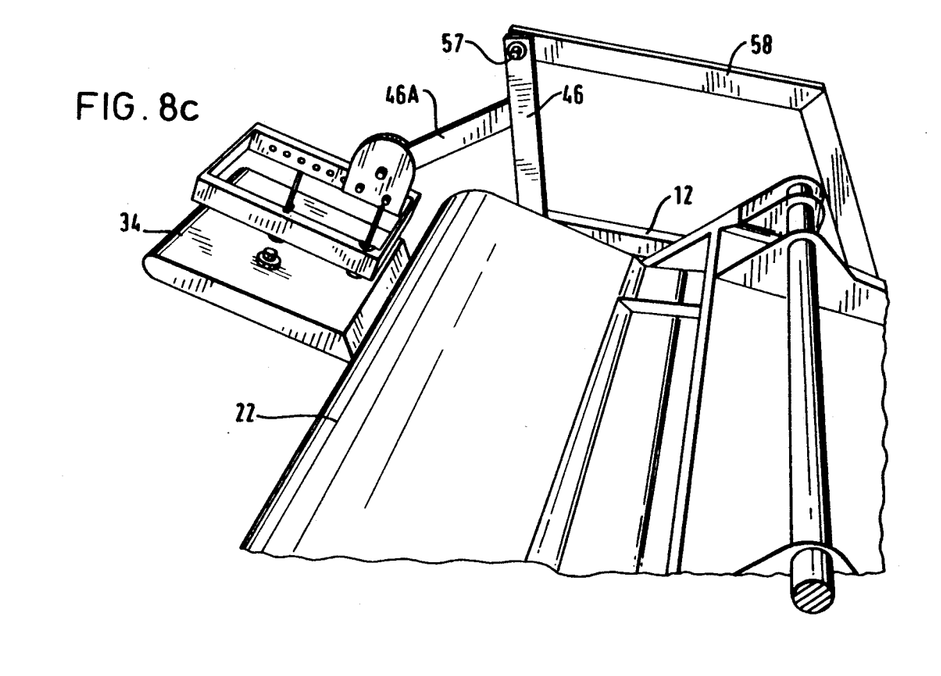
FIGS. 8c and 8d show perspective views from above and below, respectively, of a sensor nose of the apparatus of FIGS. 8, 8a and 8b.
Figure 8D:
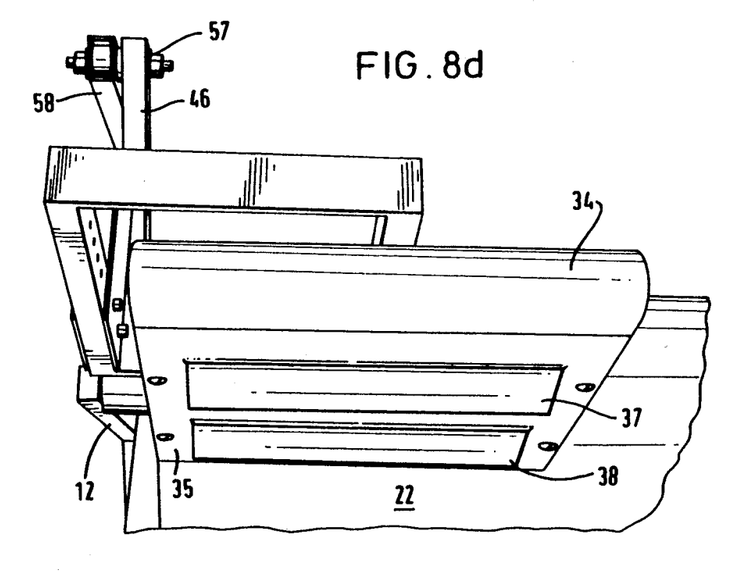

Referring now to FIGS. 8 to 8d, there is shown a further modified form of the apparatus. FIG. 8 shows a general side view of the apparatus and FIG. 8a and 8b show side views partly in section to illustrate the mounting arrangement of the hood 18. Referring firstly to FIG. 8a, the hood 18 is mounted for movement by pivoting about two moving pivot points 50 and 51. The hood 18 is pivotally secured at the pivot 50 to a hood support arm 52 which is itself pivotally mounted at 53 on the frame 12. The upper end of the hood 18 is pivotally mounted at pivot 51 on a roller indicated diagrammatically at 54, which is moveable along a rail 55, fixed relative to the frame 12. Thus the hood 18 is moveable along a complex path constrained by the hood support arm 52, and the rail 55. The movement of the hood 18 is effected by expansion and contraction of the ram 14, which in this embodiment is coupled between the frame 12, and a pivot 56 on the hood support arm 52. The lower end of the ram 14 is pivotally mounted by a pivot 60 to the frame 12.

The complex movement of the hood 18 is required in order to position the hood 18 in a required operating relationship relative to the rotor 11, during vertical movement of the hood inlet edge 30 relative to the crop. The shape of the crop flow passage 33 between the underside of the hood 18 and the rotor 11, has been found to be important in determining crop losses during harvesting.

The apparatus of FIG. 8a shows the sensor nose 34 mounted on an adapted parallelogram linkage, to produce vertical movement of the sensor nose 34 with the hood nose 22, whilst maintaining the inclination of the undersurface 35 of the sensor nose 34 constant relative to the horizontal. The sensor nose 34 is mounted forwardly of the hood nose 22, on forwardly extending projection 46A of a sensor nose support arm 46 which is pivoted on the same pivot 50 which pivotally connects the hood support arm 52 and the hood nose 22. The sensor nose support arm 46 extends between the pivot 50 and a floating pivot 57, by which the support arm 46 is pivoted to an upper link 58. The upper link 58 is pivotally linked to the frame 12 at a pivot 59, at the end of the link 58 remote from the floating pivot 57. As shown in FIGS. 8c and 8d, the sensor nose 34 is cantilevered laterally from the extension 46A of the side support arm 46 so as to be positioned in front of the hood nose 22.

Returning to FIG. 8a, it will be seen that the sensor nose 34 is mounted on the frame 12 by a parallelogram linkage formed by the rear portion of the sensor nose support arm 46, between the pivots 50 and 57; the upper link 58 extending between the floating pivot 57 and the fixed pivot 59; the hood support arm 52, extending between the floating pivot 50 and the fixed pivot 53; and a portion of the frame 12 extending between the pivots 59 and 53. The essential geometry of the parallelogram linkage is indicated by the broken lines 70. Comparing this arrangement with the arrangement of FIG. 7a, it will be seen that in each case the sensor nose 34 is coupled to the frame 12 by a parallelogram linkage consisting of the sensor nose support arm 46, a component supporting the movement of the hood 18 (side member 19 in FIG. 7a, or hood support arm 52 in FIG. 8a); and a link between the main frame 12 and the hood support arm (upper link 48 in FIG. 7a, or upper link 58 in FIG. 8a).

By way of example of dimensions, the hood nose 22 may be 3 m wide, and the sensor nose 34 may be 370 mm wide.

Considering FIGS. 8a and 8b further, the arrangement shown provides a further advantage with regard to the positioning of the sensor nose 34. FIG. 8b shows the same view as FIG. 8a, but with the hood 18 in a raised position. A diagrammatic scale of crop height is shown in each figure, indicated at H, showing crop height in centimeters. In FIG. 8a, the acceptable height range (A.H.R.) (the range of height set by the sensors within which no height change is required for the hood inlet edge) is set at 10 cm, being the vertical height difference between the sensors 37 and 38, shown as lying between 50 and 60 cm . In the example shown in FIG. 8a, the average height of the top of the crop is, say, 50 cm. When the sensor nose 34 is positioned so that this height falls midway between the heights of the sensors 37 and 38, then the height of the hood inlet edge 30 is positioned at 40 cm.

Referring to FIG. 8b, an average crop height of 100 cm is shown, with the sensor nose 34 positioned accordingly. Due to the paths of movement of the hood 18, and the sensor nose 34, the height of the hood inlet edge then falls at approximately 80 cm. This arises because the sensor nose 34 has moved upwardly relative to the hood inlet edge 30. As a result of the geometry chosen, the hood inlet edge in each case is positioned at approximately 80 percent of the average crop height. It is found in practice that positioning the hood inlet edge at a fixed percentage of the crop height, for example 80 percent, gives advantageous harvesting operation, particularly reduced crop losses. Therefore it is a preferred feature of embodiments of the invention, that the vertical height difference between the sensors 37 and 38, and the hood inlet edge 30, increases as the hood is raised.

In the examples described with reference to the drawings, the invention has been used to monitor a crop profile or contour and to control a machine in response to the sensor output so as to relate the position of the harvesting parts to that profile.

It is to be appreciated that the invention also finds application in an inverse arrangement where the height of the crop is monitored after the operation has taken place. By using the sensor to monitor the result of the operation, it is possible to control the machine to maintain the conditions of the operation. By way of example, there may be considered a long hedge growing across an undulating field. A tractor mounted cutting bar is fitted to the side of the tractor so as to trim the top of the hedge. With the sensor mounted behind the cutter and contacting a freshly trimmed part of the hedge (cut, for example, with the machine under manual control for 2.3 feet), it is possible to maintain constant the position of the cutter. If the tractor runs into a depression in the field then the cutter can be made to rise relative to the soil surface and, conversely, to be lowered if the tractor goes over a bump in the ground. The result of all this is a trimmed hedge, the top of which is horizontal and level without mimicking the contours of the soil below.

I claim:

1. Apparatus for sensing the position of the top of a crop comprising
   a support structure adapted to be attached to a mobile machine, and
   a pair of sensors mounted on the support structure in such a manner as to be spaced apart vertically from each other in use for sensing the position of the top of a crop by contact of different combinations of the two sensors of said pair with the crop during forward movement of the machine relative to the crop, the contact of different combinations of the two sensors with the crop including contact of both sensors of the pair of sensors with the top of the crop, contact of one sensor of the pair of sensors with the top of the crop, and no sensor of the pair of sensors contacting the top of the crop,
   the support structure having an undersurface adapted to be presented to the top of the crop with the undersurface facing downwardly and sloping upwardly in the forward direction of intended movement of the support structure with the machine, the sensors being spaced apart along the undersurface in the direction of intended movement.

2. Apparatus according to claim 1 in which each sensor comprises a moveable sensing element pivoted about a horizontal axis and a counterbalance element pivoted about the same axis and arranged to counterbalance the moveable sensing element.

3. Apparatus for operating on a crop comprising:
   a mobile frame for movement relative to a standing crop,
   operating means mounted on the frame for operating on the crop,
   a support structure positioned on the apparatus, and
   a pair of sensors mounted on the support structure in such a manner as to be spaced apart vertically from each other for sensing the position of the top of a crop by contact of different combinations of the two sensors of the pair of sensors with the crop during forward movement of the apparatus relative to the crop, the contact of different combinations of the two sensors with the crop including contact of both sensors of the pair of sensors with the top of the crop, contact of one sensor of the pair of sensors with the top of the crop, and no sensor of the pair of sensors contacting the top of the crop,
   the support structure having an undersurface adapted to be presented to the top of the crop with the undersurface facing downwardly and sloping upwardly in the forward direction of intended movement of the apparatus, the sensors being spaced apart along the undersurface in the direction of intended movement.

4. Apparatus according to claim 3 including means for varying the height of the support structure automatically in response to changes in crop height, and in such a manner as to maintain substantially constant the slope of the said undersurface of the support structure during variation in height of the support structure.

5. Apparatus according to claim 3 including control means for varying an operating parameter of the apparatus automatically in response to a measure of the position of the top of the crop.

6. Apparatus according to claim 5 in which the two cooperating sensors comprise a lower sensor and a higher sensor, each sensor being switchable between a first state corresponding to contact with the crop and a second state corresponding to non-contact with the crop, the control means being coupled to the two sensors and being arranged to respond to three combinations of states of pair of sensors, namely to respond to crop contact with neither sensor, by decreasing the height of a component of the machine; to respond to crop contact with both sensors, by increasing the height of the component of the machine; and to respond to crop contact with the lower sensor only, by making no change in the height of the component of the machine.

7. Apparatus according to claim 5 which the control means for varying the operating parameter comprises means for varying the height of a component of the apparatus automatically in response to changes in height of the top of the crop.

8. Apparatus according to claim 7 in which the support structure is coupled to the said component in such a manner that the height of the support structure is varied by movement of the component but the slope of the said undersurface of the support structure is maintained substantially constant.

9. Apparatus according to claim 8 in which the support structure is mounted by a parallelogram linkage having one pivot point fixed relative to the support structure, one pivot point fixed relative to the said moving component, and two further pivot points fixed relative to a selected framework of the apparatus.

10. Apparatus according to claim 7 including a moveable hood extending over at least part of the operating means, the support structure being coupled to the hood, and the hood being moveable to vary the height of the front of the hood in response to changes in crop height.

11. Apparatus according to claim 10 in which the hood defines a crop flow passage between the underside of the hood and the operating means and the front of the underside of the hood is bounded by a hood inlet edge positioned at the inlet to the crop flow passage, the support structure being coupled to the moveable hood in such a manner that the hood inlet edge is positioned at a height which is a substantially constant proportion of the average height of the crop.

12. Apparatus according to claim 11 in which the said proportion lies in the range 70% to 90%.

13. Apparatus according to claim 11 in which the support structure is coupled to the moveable hood in such a manner that the vertical height difference between the sensors and the hood inlet edge, increases as the hood is raised, and decreases as the hood is lowered.

14. Apparatus according to claim 3 which the operating means comprises crop stripping means for stripping from a standing crop required parts of the crop to leave the remaining stripped parts of the crop standing in the field.

15. Apparatus according to claim 14 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop.

16. Apparatus according to claim 3 in which said undersurface of the support structure is inclined to the horizontal, in use, at an angle in the range 5° to 45°.

17. Apparatus for sensing the position of the top of a crop comprising
a support structure adapted to be attached to a mobile machine, and
at least three sensors mounted on the support structure in such a manner as to be spaced apart from each other vertically in use for sensing the position of the top of a crop by contact of different combinations of sensors with the crop during forward movement of the machine relative to the crop, the contact of different combinations of the sensors with the crop including selections of combinations from the group including contact of all of the sensors with the top of the crop, contact of some of the sensors with the top of the crop, contact of one of the sensors with the top of the crop, and contact of none of the sensors with the top of the crop,
in which the support structure has an undersurface adapted to be presented to the top of the crop with the undersurface facing downwardly and sloping upwardly in the forward direction of intended movement of the support structure with the machine, the sensors being spaced apart along the undersurface in the direction of intended movement.

18. Apparatus according to claim 17 in which each sensor comprises a moveable sensing element pivoted about a horizontal axis and a counterbalance element pivoted about the same axis and arranged to counterbalance the moveable sensing element.

19. Apparatus for operating on a crop comprising
a mobile frame for movement relative to a standing crop,
operating means mounted on the frame for operating on the crop,
a support structure positioned on the apparatus, and
at least three sensors mounted on the support structure in such a manner as to be spaced apart from each other vertically for sensing the position of the top of a crop by contact of different combinations of sensors with the crop during forward movement of the apparatus relative to the crop, the contact of different combinations of the sensors with the crop including selections of combinations from the group including contact of all the sensors with the top of the crop, contact of some of the sensors with the top of the crop, contact of one of the sensors with the top of the crop, and contact of none of the sensors with the top of the crop,
in which the support structure has an undersurface adapted to be presented to the top of the crop with the undersurface facing downwardly and sloping upwardly in the forward direction of intended movement of the apparatus, the sensors being spaced apart along the undersurface in the direction of intended movement.

20. Apparatus according to claim 19 including means for varying the height of the support structure automatically in response to changes in crop height, and in such a manner as to maintain substantially constant the slope of the undersurface of the support structure during variation in height of the support structure.

21. Apparatus according to claim 19 including control means for varying an operating parameter of the apparatus automatically in response to a measure of the position of the top of the crop.

22. Apparatus according to claim 21 in which the control means for varying the operating parameter comprises means for varying the height of a component of the apparatus automatically in response to changes in height of the top of the crop.

23. Apparatus according to claim 22 in which the support structure is coupled to the component in such a manner that the height of the support structure is varied by movement of component but the slope of the undersurface of the support structure is maintained substantially constant.

24. Apparatus according to claim 23 in which the support structure is mounted by a parallelogram linkage having one pivot point fixed relative to the support structure, one pivot point fixed relative to said moving component, and two further pivot points fixed relative to a selected framework of the apparatus.

25. Apparatus according to claim 19 including a moveable hood extending over at least part of the operating means, the support structure being coupled to the hood, and the hood being moveable to vary the height of the front of the hood in response to changes in crop height.

26. Apparatus according to claim 25 in which the hood defines a crop flow passage between the underside of the hood and the operating means and the front of the underside of the hood is bounded by a hood inlet edge positioned at the inlet to the crop flow passage, the support structure being coupled to the moveable hood in such a manner that the hood inlet edge is positioned at a height which is a substantially constant proportion of the average height of the crop.

27. Apparatus according to claim 26 in which said proportion lies in the range 70% to 90%.

28. Apparatus according to claim 26 in which the support structure is coupled to the moveable hood in such a manner that the vertical height difference between the sensors and the hood inlet edge, increases as the hood is raised, and decreases as the hood is lowered.

29. Apparatus according to claim 19 which the operating means comprises crop stripping means for stripping from a standing crop required parts of the crop to leave the remaining stripped parts of the crop standing in the field.

30. Apparatus according to claim 29 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop.

31. Apparatus according to claim 19 in which said undersurface of the support structure is inclined to the horizontal, in use, at an angle in the range 5° to 45°.

* * * * *